United States Patent [19]

Lindenthal

[11] Patent Number: 4,895,549
[45] Date of Patent: Jan. 23, 1990

[54] UNIVERSAL JOINT FOR A HIGHLY STRESSED CARDAN SHAFT

[75] Inventor: Hans Lindenthal, Heidenheim, Fed. Rep. of Germany

[73] Assignee: J. M. Voith GmbH, Fed. Rep. of Germany

[21] Appl. No.: 136,372

[22] Filed: Dec. 22, 1987

[30] Foreign Application Priority Data

Dec. 23, 1986 [DE] Fed. Rep. of Germany ....... 3644204

[51] Int. Cl.$^4$ .............................................. F16D 3/41
[52] U.S. Cl. .................................................. 464/136
[58] Field of Search ......................... 464/130, 132, 136

[56] References Cited

U.S. PATENT DOCUMENTS

| | | | |
|---|---|---|---|
| 2,026,997 | 1/1936 | Rice | 464/130 X |
| 3,065,612 | 11/1962 | Tiffin et al. | 464/136 X |
| 3,200,615 | 8/1965 | Stokely | 464/130 X |
| 3,204,428 | 9/1965 | Stokely | 464/130 |

FOREIGN PATENT DOCUMENTS 2625960 11/1977 Fed. Rep. of Germany ...... 464/132

Primary Examiner—Daniel P. Stodola
Attorney, Agent, or Firm—Ostrolenk, Faber, Gerb & Soffen

[57] ABSTRACT

A universal joint for a highly stressed cardan shaft possesses, in order to increase the rigidity and load-bearing capacity of the bearings in the trunnion cross bearing, a tie-rod which extends through a central longitudinal hole through two opposing trunnions. The bearing covers of the two opposing bearing eyes are fixed to the tie-rod under pre-stress and bear from outside against the outer ring of the radial bearing. The bearing covers carry tracks on the inner sides for the axial bearing arranged in the region of the trunnion end face. The transverse forces are thus passed to the respectively opposite joint yoke half, so that no deformation arises to spray the joint yoke. As a result the formation of axial play is prevented, and all bearings are uniformly stressed, as a result of which greater load-bearing capacity and longer service life are obtained.

10 Claims, 1 Drawing Sheet

UNIVERSAL JOINT FOR A HIGHLY STRESSED CARDAN SHAFT

BACKGROUND OF THE INVENTION

The invention relates to a universal joint for a cardan shaft suitable for transmitting high torques, having two joint yokes, each of which is connected to two trunnions of a trunnion cross, having the following features:

(a) each joint yoke comprises a single part, i.e. one joint yoke hub and two yoke eyes together form an integral component;

(b) each trunnion of the trunnion cross is mounted by means of a radial bearing and by means of an axial bearing separate therefrom in the assigned yoke eye, which is provided with a bearing cover; and (c) the axial bearing is located between the end face of the trunnion and the bearing cover, which (directly or indirectly) rests on a supporting surface of the yoke eye facing away from the axis of rotation of the cardan shaft. A universal joint of this generic type is known from German Patent No. 2,625,960 (British Patent No. 1,539,497).

When cardan shafts of this type are used in heavy engineering, the joints are exposed, depending on the individual case, not only to high torques but also, to a substantial degree, to transverse forces. The universal joints are therefore equipped not only with radial bearings, which serve primarily to transmit the peripheral forces, but also with axial bearings to absorb the transverse forces and to adjust the transverse play within the joint. The transverse forces are transmitted from the trunnion cross to the joint yoke, or vice versa, by way of the roller bearing rings concerned, which have to be axially secured in the receiving hole in the joint yoke, this securing being fully subjected to the transverse force.

It is known from German Patent No. 2,625,960 that the transverse forces acting in the longitudinal axis of the trunnion can be passed directly from the end face of the trunnion into the bearing cover. The possibility then exists of passing the transverse force either via screws into the yoke or via a securing ring which is inserted in grooves within the bearing hole. The securing rings, however, are often inadequate to accommodate the loads arising in heavy engineering, and are forced out of the groove, which results in destruction of the bearing.

Attempts have therefore been made to pass the transverse force from the region of the trunnion root, in other words the transition zone between two adjacent trunnions, onto a radial bearing outer ring provided with a collar into the joint yoke (German Utility Model No. 1,858,494). To do this, however, either the outer ring must be inserted before the assembly of the trunnion cross, or the bearing eye with the bearing hole in the joint yoke must be of two-part design. The latter measure entails substantial weakening of the joint and of the trunnion cross in the region of the trunnion root, since this arrangement of the axial bearing in the region of the trunnion root occupies precisely that structural space which is necessary for a robust design of the trunnion cross.

In all solutions described hitherto, the joint yoke in question is also subjected to the full transverse force in addition to the peripheral force. The joint yoke half particularly concerned is thereby deformed radially outwards away from the joint axis. As a result of this deformation the opposing axial bearing is relieved of stress, and a corresponding play arises. The play in the cardan shaft not only reduces the quietness of running of the cardan shaft and the service life of all bearings in the joint, but also impairs the quality of the rolled product when the cardan shaft is used in rolling mills.

SUMMARY OF THE INVENTION

The object of the invention is to develop the conventional universal joint in such a way that all bearings are uniformly stressed, with a view to increasing service life, and that the occurrence of play in the joint resulting from the action of transverse forces is avoided.

This object is achieved by means of the following features:

(d) a central longitudinal hole (16) extends along the axes of the trunnions (4) through the trunnion cross (3);

(e) a tie-rod (17), which connects two mutually opposed bearing covers (14) to one another, extends through the central longitudinal hole (16);

(f) an outer ring (6) is assigned to each radial bearing (5), and each bearing cover (14) is supported via the outer ring (6) on the assigned yoke eye in the direction of the axis of rotation of the cardan shaft; and (g) the bearing cover (14) is secured against twisting relative to the joint yoke and is radially mobile. The inventor has recognized that what is responsible for the load-bearing capacity of the roller bearings is the rigidity of the entire joint, but primarily the rigidity in the region of the closed bearing holes in the one-part bearing halves and within the bearings themselves. Accordingly, the aim is to keep the bearings in the joint free of the deformation of the other parts of the joint. According to the invention, this is achieved by the following measures:

The trunnion cross possesses a longitudinal hole extending centrally along the trunnion axis through the trunnions, in which a rod-shaped tie-rod is located. The bearing covers of the two mutually opposed bearings are attached to this tie-rod. The bearing covers bear on their insides the radially outer track of the axial bearings and bear on the end faces of the joint yoke in the region of the bearing holes.

A universal joint whose trunnion cross is provided with longitudinal holes through which a tie-rod extends is known from British Patent No. 1,033,628. In that patent the trunnions are mounted in bearing cups which are closed at their end faces and have needle bearings without inner or outer rings, these bearing cups themselves forming the halves of the joint yoke and being screwed to the end face of a flange. The principal function of the tie-rod is to absorb the centrifugal forces of the two bearing cups as a whole, where it must be borne in mind that the joint is to be suitable for high speeds of rotation. However, because of the multi-component construction, it is not suitable for transmitting high torques.

By contrast, the achievement of the solution according to the invention is as follows: The transverse force to be transmitted to the joint yoke, which force, in an appropriate angular position of the cardan shaft, acts as an axial force away from the joint axis toward the trunnion axis, is passed from the end face of the trunnion via the inner track of the axial bearing and the axial bearing rollers to the other track on the bearing cover. In this arrangement, however, in contrast to the case of known universal joints, the force is not transmitted to the joint yoke by the shortest route via the bearing cover or the bearing cup by means of screws, or via the shaft of the radial bearing outer ring connected to the bearing cover, by means of securing rings. According to the invention the transverse force is passed from one bearing cover, which is not fixedly connected to the joint yoke half, into the tie-rod connected to this bearing cover, which tie-rod leads to the bearing cover of the opposite bearing and is fixed there in the same manner. At this point the force is absorbed at this joint yoke half, acting towards the joint axis.

In a preferred embodiment of the invention, the radial bearings possesses an outer ring which can be pushed from outside into the bearing hole, as far as a stop. In this arrangement the bearing cover can bear directly on the end face of the outer ring, or on the end face of the joint yoke, so that the bearing cover represents the axial securing of the outer ring.

The advantage of this arrangement consists in the fact that the two bearing covers of the joint yoke are stressed together by means of the tie-rod passing through the trunnion cross and simultaneously press the radial bearaing outer rings against their stops. A transverse force acting against one bearing cover is thus not absorbed by that joint yoke half towards which the transverse force is directed from the axis of the joint, but is absorbed by the opposite joint yoke half. The result is not a deformation of that joint yoke half in which the axial bearing is subjected to transverse force, because the transverse force is absorbed by that joint yoke half whose axial bearing is unstressed. In the solution according to the invention the transverse force to be absorbed by the joint yoke is always directed towards the axis of the joint, so that devices to secure bearing rings against radial outward displacement can be omitted. The bearing cover on the radial bearing outer ring of the opposite bearing arrangement undertakes the axial securing for the radial bearing on one side of the tie-rod.

The most important circumstance here is that, as a result of this arrangement, the stressed bearing is kept free of deformations in the region of the bearing hole in the joint yoke. As a result optimum load-bearing performance is ensured both in the radial bearing and in the axial bearing, and an optimum service life is also ensured without loss of structural space.

Advantageous embodiments of the invention are disclosed herein. The length of the tie-rod connecting the two bearing covers can be dimensioned so that both axial bearings are under a definable pre-stress which is exerted by the tie-rod as tensile stress. The transverse forces described always arise in the joint simultaneously with the radial forces resulting from the torque transmission. As a result, the trunnion cross and also the joint yoke are subjected to a deformation which originates from the torque transmission. In order to stress the axial bearing as uniformly as possible on the inside of the bearing cover, provision is made for arranging one track of the axial bearing as close as possible to the trunnion axis in the region of the end face of the trunnion, preferably on the end face of the radial bearing inner ring. The bearing cover, which according to the invention is not directly connected either to the radial bearing outer ring nor to the joint half itself, can be provided with the ability for radial movement and with a seal against the inside of the bearing, so that the bearing cover with the end of the tie-rod attached thereto can adapt to the deformations without rising free of the radial bearing outer ring. This is achieved, in particular, when the bearing cover is designed to be flexible to bending in its outer diametral region but resistant to bending in the region of the outer track for the rollers of the axial bearing. A seal against the escape of lubricant or penetration of dirt can be provided between the two bearing rings of the radial bearing, in the region of the trunnion root. It is also possible to provide, without loss of structural space, a collar on the radial bearing inner ring which points away from the trunnion axis, extends to the outer diameter of the radial bearing outer ring, and can be retracted from the bearing hole with the outer ring together with the inner ring.

BRIEF DESCRIPTION OF THE DRAWINGS

An exemplary embodiment of the invention is described in detail below with reference to the drawing, in which.

DETAILED DESCRIPTION

Figure 1:
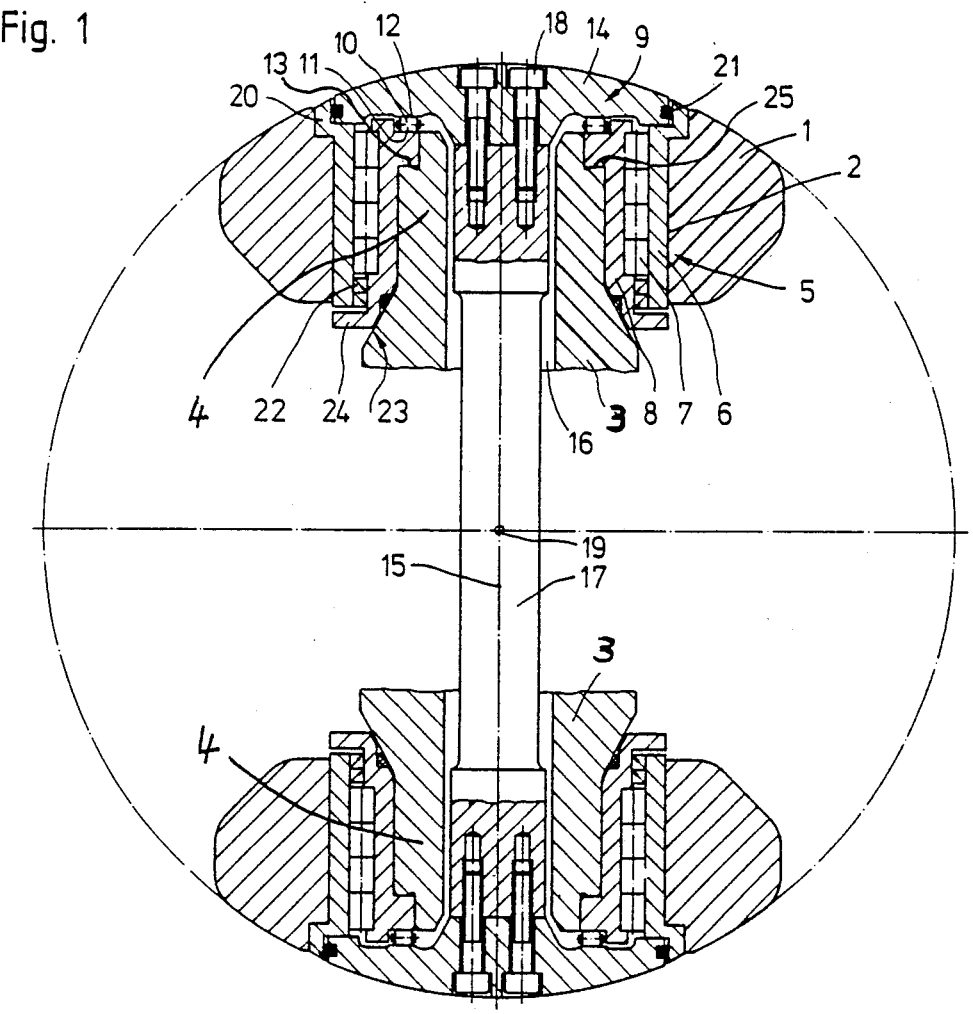
FIG. 1 shows a sectional view through a universal joint in a plane lying through the trunnion axis and perpendicular to the joint axis.

The universal bearing according to FIG. 1 possesses a joint yoke 1 consisting of two halves, in the bearing hole 2 of which yoke a trunnion cross 3 is rotatably mounted by means of a roller bearing arrangement. The roller bearing consists of a radial bearing 5 having an outer ring 6, the rollers 7 and an inner ring 8, and of an axial bearing 9. The rollers 10 of the axial bearing 9 roll on an inner track 11 which is located on the end face of the inner ring 8 of the radial bearing 5, and on an outer track 12 which is fitted to the inside of a bearing cover 14. A collar 13 on the inner ring 8 can serve to guide the rollers 10 radially.

The trunnion cross 3 possesses a central longitudinal hole 16 extending along the trunnion axis 15 through the trunnions 4, and reaching from one end face to the opposite end face of the trunnion cross 3. In the longitudinal hole 16 is located an elongated tie-rod 17 to which are fixed, e.g. by means of screws 18, the bearing covers 14 of both bearing arrangements arranged in the trunnion axis 15. The bearing cover 14 also bears on the end face of the outer ring 6 of the radial bearing 5 but is not connected thereto. The outer ring 6 can be pushed radially from the outside along the trunnion axis 15 towards the joint axis 19 as far as a stop. This stop can, as shown, be a collar 20 on the outer ring 6 which points away from the trunnion axis 15 and comes to bear on the joint yoke 1. Instead of this, it is also possible to provide in the hole 2 of the joint yoke 1 a collar which points towards the trunnion axis 15. The bearing cover 14 possesses the ability to move radially relative to the end face of the outer ring 6 or the joint yoke 1, and is also provided with a seal 21 to prevent lubricant escaping from the bearing arrangement. In addition, the bearing cover 14 is secured opposite the outer ring 6 or the joint yoke 1 to prevent twisting (not shown). A further seal 22 is situated between the outer ring 6 and the inner ring 8. The inner ring 8 additionally possesses, in the root region 23 of the trunnion 4 facing the joint axis 19, a collar 24 extending away from the trunnion axis 15 and reaching into the diametral region of the outer ring 6. By means of this collar, when the joint is dismantled, the outer ring 6 can be retracted from the hole 2 jointly with the inner ring 8.

The conventional joint possesses step-shaped shoulders on the end face of the trunnions. These enable the trunnion cross to be threaded into the bearing holes from inside, before the bearings are inserted from outside. In the case of the invention this step-shaped shoulder can be utilized by providing the inner ring 8 with a collar 25 which serves as a stop during assembly and also as an inner track 11 for the rollers 10 of the axial bearing 9.

In the known universal joint it is not possible to put the axial bearings under a controllable pre-stress. The securing rings for the outer ring, which are intended to pass the transverse force into the joint yoke, can only be inserted into the groove if the bearing ring concerned is not under pre-stress. In the case of the invention, by contrast, the tie-rod 17 is capable of setting the axial bearing under a definable pre-stress by exact dimensioning of length. Because the axial bearings 9 are arranged on the end faces of the trunnions 4, they are not subject to the deformation of the trunnion 4 at their trunnion root 23. The deformation of the hole 2 in the joint yoke and of the bearing under the action of the peripheral force can be elastically absorbed by the bearing cover 14 and passed into the tie-rod 17. In this case it is advantageous to design the outer diametral region of the bearing cover 14 to be so flexible that, notwithstanding, there is no lifting away from the end face of the outer ring 6. It proves advantageous that, when the transverse force is transmitted from one yoke half to the other, these are flexibly submitted to the tensile pre-stress exerted by the tie-rod 17. As a result the bearing covers 14 can follow the inevitable deformations without play arising in the bearings (as a result of radial expansion when transverse forces occur) and hence play in the joint. The tie-rod 17 which stresses the bearing covers 14 and axial bearings 9 against one another thus helps to increase substantially the rigidity of the joint and hence the service life of all bearings.

A universal joint designed according to the invention can be used particularly advantageously in the case of cardan shafts having a trunnion cross whose trunnions are arranged in two planes offset along the axis of the joint, and also in the case of cardan shafts whose end faces bend in a tubular shape, e.g. according to U.K. Patent Application No. 8 814 943.0.

Figure 2:
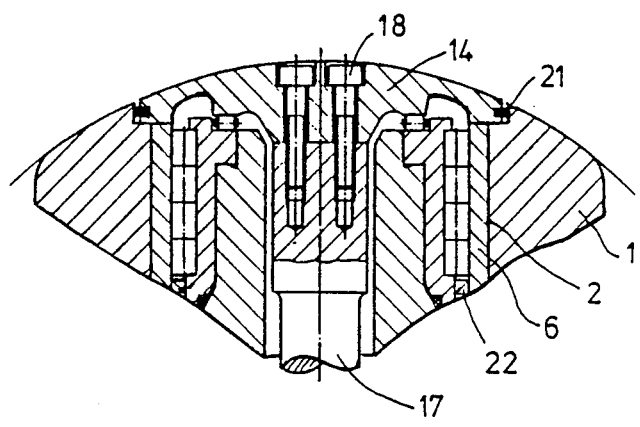
FIG. 2 shows another embodiment in the contact region of the bearing cover on the joint yoke.

FIG. 2 shows another arrangement of the bearing cover 14 in the region of the joint yoke. The radial bearing outer ring 6 is designed without a collar at its end face and ends flush with the bearing hole 2. The stop for the outer ring is situated (not shown) on the inside of the bearing hole 2. The bearing cover 14 bears directly, with radial mobility and sealing and also securing against twisting (not shown), at the outer end on a machined surface of the joint yoke.

What is claimed is:

1. Universal joint for a cardan shaft suitable for transmitting high torques, having two joint yokes, each of which is connected to two trunnions of a trunnion cross, having the following features:
   (a) each joint yoke comprises a single part, wherein one joint yoke hub and two yoke eyes together form an integral component;
   (b) each trunnion of the trunnion cross is mounted by means of a radial roller bearing and by means of an axial roller bearing separate therefrom in a corresponding bearing hole in a respective yoke eye, and a bearing cover covers said bearings and said bearing hole;
   (c) each axial bearing is located between the end face of the trunnion and the bearing cover, which is supported at least in part by a supporting surface of the yoke eye facing away from the axis of rotation of the cardan shaft;
   (d) a central longitudinal hole extends along the axes of the trunnions through the trunnion cross;
   (e) a tie-rod, which connects two mutually opposed bearing covers to one another, extends through the central longitudinal hole;
   (f) an outer ring is assigned to each radial bearing, and each bearing cover is supported via the outer ring on the assigned yoke eye in the direction of the axis of rotation of the cardan shaft; and
   (f) each bearing cover is secured against twisting relative to the joint yoke and is radially mobile.

2. Universal joint according to claim 1, characterized in that the length of the tie-rod is such that the axial bearings of both opposed bearings are subjected to axial pre-stress directed towards the joint axis after the attachment of the covers to the tie-rod;

3. Universal joint acording to claim 2, wherein the outer rings of the radial bearings of both opposed bearings are also subjected to axial pre-stress directed towards the joint axis after the attachment of the covers to the tie-rod.

4. Universal joint acording to claim 1, characterized in that the radial bearing possesses an inner ring having an annular surface facing the bearing cover as a track for the axial bearing.

5. Universal joint according to claim 1, characterized in that the end of the trunnion is tapered stepwise towards its shaft, and the inner ring of the radial bearing is provided with a collar penetrating this tapering and pointing toward the axis of the trunnion, on which collar the track of the axial bearing is located.

6. Universal joint according to claim 1, characterized in that one of the outer or inner rings of the radial bearing is provided with a retraction collar pointing to the other ring so as to engage said other ring and thereby enable said rings to be retracted as a unit from the bearing hole during dismantling.

7. Universal joint according to claim 6, characterized in that the retraction collar is fitted to the inner ring of the radial bearing and extends away from the trunnion axis into the diametral region of the outer ring.

8. Universal joint according to claim 1, characterized in that a seal is provided between the inner ring and outer ring of the radial bearing in the region facing the trunnion root.

9. Universal joint according to claim 1, characterized in that the bearing cover is resistant to bending in the region of the outer track of the axial bearing which is defined by said bearing cover, and flexible to bending in the region of the bearing surface on the outer ring of the radial bearing.

10. Universal joint according to claim 1, characterized in that the axial bearing has rollers, and the rollers of the axial bearing are guided between the bearing cover and a collar formed in the inner ring of the radial bearing.

* * * * *